Nov. 29, 1960 T. E. BUCHANAN 2,961,793
FISHING DEVICE
Filed July 28, 1958

Thomas E. Buchanan
INVENTOR.

United States Patent Office 2,961,793
Patented Nov. 29, 1960

2,961,793

FISHING DEVICE

Thomas E. Buchanan, 1234 W. High St., Lima, Ohio

Filed July 28, 1958, Ser. No. 751,330

2 Claims. (Cl. 43—42.74)

This invention relates to new and useful improvements in tackle particularly for still fishing and has for its primary object to provide, in a manner as hereinafter set forth, novel means for adjustably supporting the bait at any desired distance from the bottom of a body of water.

Another very important object of the present invention is to provide a fishing device of the character described wherein, when a strike is had, the pull will be in a direct line from the rod tip to the hook.

Still another important object of the invention is to provide a fishing device of the aforementioned character which is positively but adjustably attached directly to the line.

Other objects of the invention are to provide a fishing device of the character set forth which will be comparatively simple in construction, strong, durable, compact, of light weight and which may be manufactured at low cost.

Figure 1:
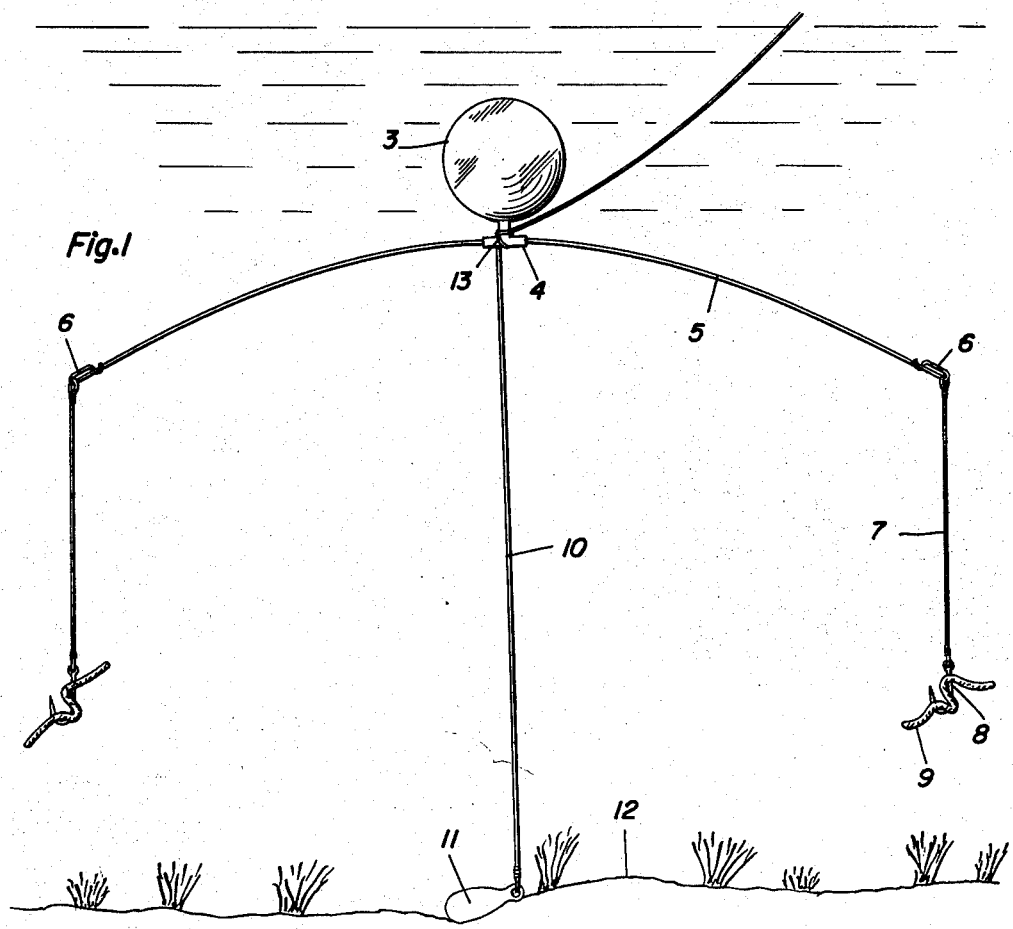
Figure 2:
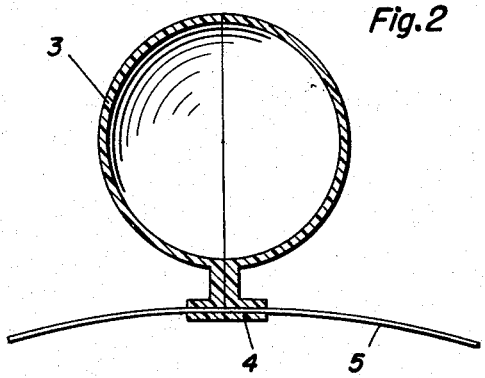

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view, showing a fishing device embodying the present invention in use; and Figure 2 is a vertical sectional view through the float.

Referring now to the drawing in detail, it will be seen that the embodiment of the invention which has been illustrated comprises a float 3 in the form of a hollow ball or sphere of a suitable transparent plastic. Depending from the float 3, which may also be of any desired diameter, is an integral, substantially T-shaped hanger 4.

Fixed at an intermediate point in the hanger 4 is a spreader 5 of a suitable resilient wire. The spreader 5 terminates in end loops 6.

Leaders 7 are suspended from the loops 6 of the spreader 5. Mounted on the free ends of the leaders 7 are conventional fishhooks 8. Reference character 9 designates bait on the hooks 8.

Reference character 10 designates a conventional fishing line. Connected to one end of the line 10 is a sinker 11. The line 10 is wound on and tied to the hanger 4 in any suitable manner.

It is thought that the use of the device will be readily apparent from a consideration of the foregoing. Briefly, the line 10 is secured at any desired intermediate point on the hanger 4 according to the distance from the bottom of the body of water, as indicated at 12, at which it is desired to fish. It will thus be seen that the line 10 is positively but detachably and adjustably connected to the float 3. The sinker 11, of course, is of sufficient weight to submerge the float 3. The construction and arrangement is such that when a bite is had and the tip of the rod elevated the pull will be in a straight or direct line from said tip to the hook 8 which has been taken. This constitutes an important and desirable feature of the invention. The spreader 5, with the baited hooks on the ends thereof, is free to rotate or turn in the water. The attachment of the fishing line 10 to the hanger 4 is indicated at 13.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing device comprising, in combination, a buoyant ball-like bobber, a companion inverted substantially T-shaped line accommodating hanger comprising a relatively short vertical stem integrated at one end to the central bottom portion of said bobber an integral crosshead having a passage therethrough, said crosshead being of a length appreciably shorter than the diameter of said bobber, and a longitudinally bowed single-piece wire spreader having a median portion thereof passing through the passage in said crosshead and secured and equal end portions projecting beyond the respective ends of the crosshead and well beyond diametricaly opposite sides of the bobber and terminating in loops adapted to accommodate fishhooks.

2. The combination of claim 1, and wherein said bobber is hollow and said T-shaped hanger is a complemental part thereof, said hanger and bobber being formed from moldable plastic material, and a fishing line, a sinker carried by the lower end of the line, and a predetermined portion of the line spaced above the position of the sinker being detachably adjustably connected with the stem and crosshead, whereby the line above the float is directly connected to the float.

References Cited in the file of this patent

UNITED STATES PATENTS

| 186,134 | Jahne et al. | Jan. 9, 1877 |
| 790,336 | Yoerger | May 23, 1905 |
| 2,157,477 | Bulow | May 9, 1939 |
| 2,603,904 | Phillips | July 22, 1952 |
| 2,615,275 | DeMello | Oct. 28, 1952 |
| 2,683,324 | Engleman | July 13, 1954 |

FOREIGN PATENTS

| 87,247 | Germany | June 1896 |
| 1,138,137 | France | Jan. 21, 1957 |